(12) United States Patent
Jones et al.

(10) Patent No.: US 11,703,177 B2
(45) Date of Patent: Jul. 18, 2023

(54) ACCESSORY MOUNTING SYSTEM AND APPARATUS

(71) Applicant: 7-Eleven, Inc., Irving, TX (US)

(72) Inventors: Ryan Jerman Jones, The Colony, TX (US); Sailesh Bharathwaaj Krishnamurthy, Irving, TX (US)

(73) Assignee: 7-ELEVEN, INC., Irving, TX (US)

( * ) Notice: Subject to any disclaimer, the term of this patent is extended or adjusted under 35 U.S.C. 154(b) by 29 days.

(21) Appl. No.: 17/455,647

(22) Filed: Nov. 18, 2021

(65) Prior Publication Data

US 2023/0151924 A1    May 18, 2023

(51) Int. Cl.
*F16M 11/06* (2006.01)
*F16M 13/02* (2006.01)
*B33Y 80/00* (2015.01)

(52) U.S. Cl.
CPC .......... *F16M 11/06* (2013.01); *F16M 13/022* (2013.01); *B33Y 80/00* (2014.12)

(58) Field of Classification Search
CPC combination set(s) only.
See application file for complete search history.

(56) References Cited

U.S. PATENT DOCUMENTS

| 7,226,025 B2 * | 6/2007 | Sato | G01J 1/04 |
| | | | 248/229.11 |
| 8,844,180 B2 * | 9/2014 | Kludt | H05K 5/06 |
| | | | 248/223.41 |
| 8,955,807 B2 * | 2/2015 | Alexander | A47F 7/024 |
| | | | 396/428 |
| 9,106,816 B1 * | 8/2015 | Hotter | F16M 11/10 |
| 9,915,855 B1 * | 3/2018 | Miyashita | F16M 13/00 |
| 11,131,908 B2 * | 9/2021 | Hatcher | G03B 17/561 |
| 2005/0029416 A1 * | 2/2005 | Buck | F16L 3/12 |
| | | | 248/200 |

\* cited by examiner

*Primary Examiner* — Monica E Millner
(74) *Attorney, Agent, or Firm* — Baker Botts L.L.P.

(57) ABSTRACT

An accessory mounting apparatus and system are provided. The system includes a structural framing, an accessory mounting apparatus, and an accessory. The accessory mounting apparatus includes a first component, a second component, and a connector arm. The first component includes a first base, a first rail connector that extends from the first base, and one or more first connectors. The second component includes a second base and a second rail connector that extends from the second base. The connector arm includes a second connector and a mounting arm, and the second connector is coupled to the one or more first connectors. Further, the first rail connector and the second rail connector are configured to engage a first rail slot and a second rail slot of the structural framing, accordingly. Additionally, the accessory is coupled to the mounting arm.

24 Claims, 4 Drawing Sheets

ACCESSORY MOUNTING SYSTEM AND APPARATUS

TECHNICAL FIELD

The present disclosure relates generally to a mounting system and apparatus, and more particularly, to a mounting system and apparatus for mounting an accessory to structural framing.

BACKGROUND

Stores, such as retail, convenience, and grocery stores, need to mount accessories, such as sensors and cameras throughout their stores. For example, sensors and cameras may be mounted in a number of locations in order to help curb theft or to create a contactless checkout system. Typically, these mounted accessories are installed directly into the ceilings, walls, or equipment, such as racks holding goods and checkout scanners, within the store. However, these typical mounts lack the ability to adjust where the accessory is mounted and provide limited degrees of freedom.

SUMMARY

The present invention is directed to an accessory mounting apparatus and system. The accessory mounting apparatus includes a first component, a second component, and a connector arm. The first component includes a first base, a first rail connector that extends from the first base, and one or more first connectors. Further, the first rail connector includes a first neck portion and a first head portion, and the first head portion includes a first flange and a second flange that extend from the first neck portion. The second component includes a second base and a second rail connector that extends from the second base. Furthermore, the second rail connector includes a second neck portion and a second head portion, and the second head portion includes a third flange and a fourth flange that extend from the second neck portion. Additionally, the connector arm includes a second connector and a mounting arm. The one or more first connectors of the first component are coupled to the second connector of the connector arm. Further, the first flange and the second flange of the first head portion of the first rail connector are configured to engage a first rail slot of a structural framing, and the third flange and the fourth flange of the second head portion of the second rail connector are configured to engage a second rail slot of the structural framing.

The accessory mounting system includes the accessory mounting apparatus, a structural framing, and an accessory. The structural framing includes a first rail slot having a first opening and a second rail slot having a second opening. The first flange and the second flange of the first head portion of the first rail connector are configured to engage the first rail slot, and the first neck portion of the first rail connector is disposed through the first opening of the first rail slot. Further, the third flange and the fourth flange of the second rail connector are configured to engage the second opening of the second rail slot, and the second neck portion of the second rail connector is disposed through the second opening of the second rail slot. Furthermore, the accessory is coupled to the mounting arm of the connector arm of the accessory mounting apparatus.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1A:
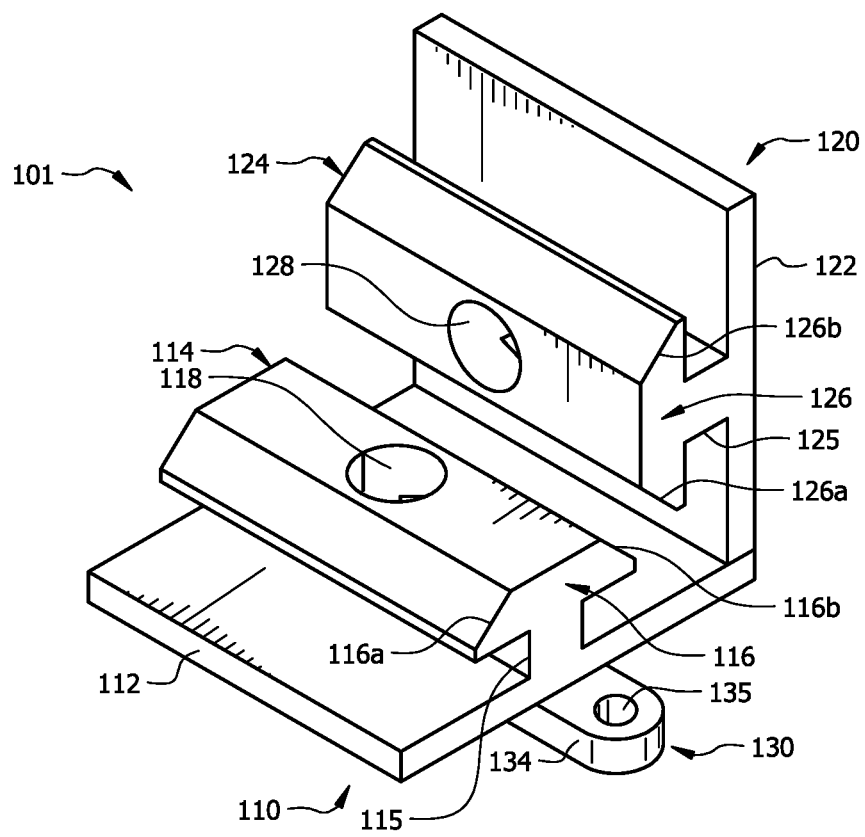
FIGS. 1A and 1B are perspective views of an accessory mounting apparatus in accordance with an embodiment of the present disclosure.
Figure 1B:
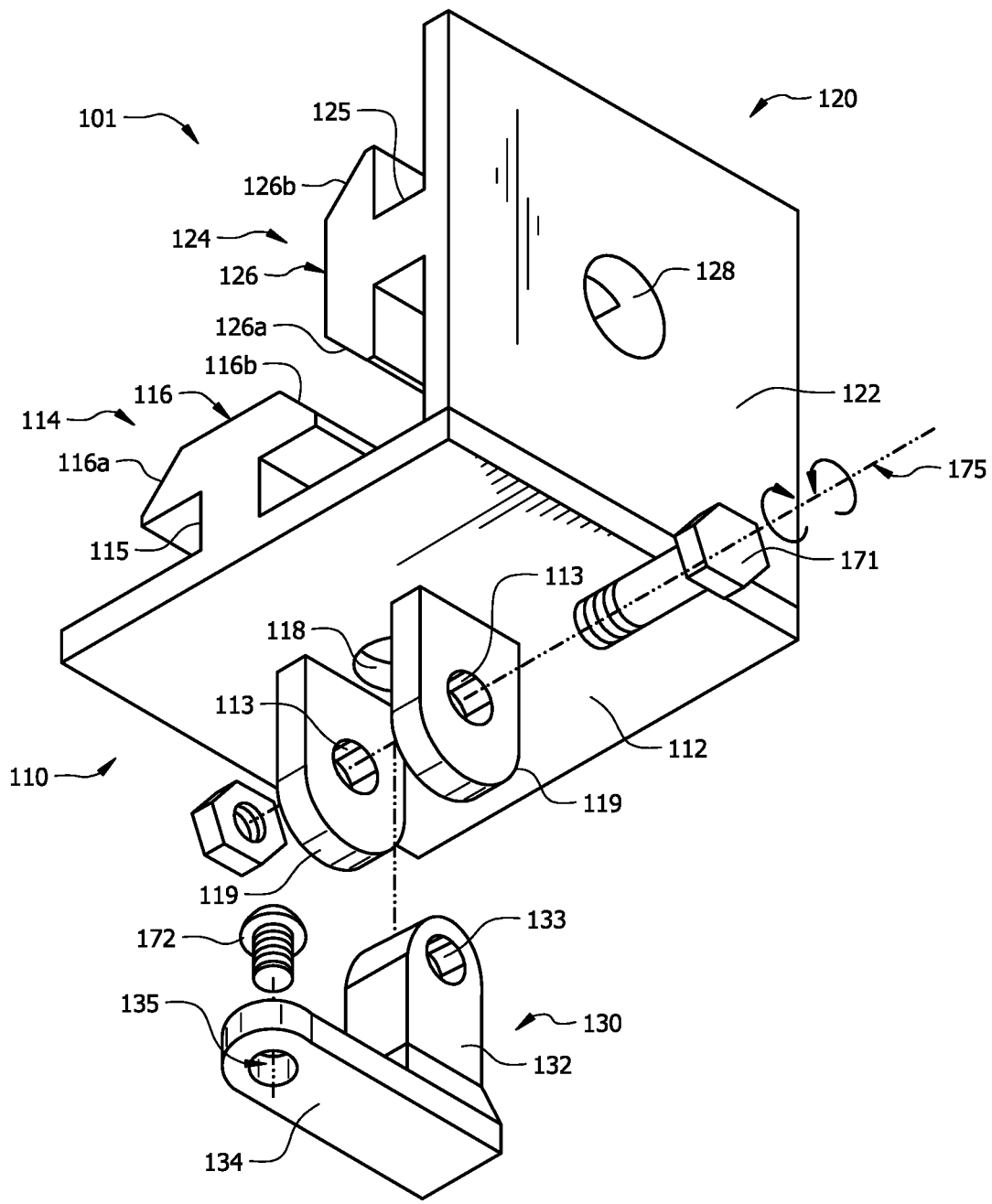

Referring to FIGS. 1A and 1B, an accessory mounting apparatus 101 according to one or more embodiments of the present disclosure is illustrated. The accessory mounting apparatus 101 may include a first component 110 and a second component 120. The first component 110 and the second component 120 may be coupled together by way of an adhesive or by one or more fasteners. By way of example, fasteners for coupling the first component 110 and the second component 120 may include screws, nails, or bolts and nuts. While in FIGS. 1A and 1B, the first component 110 and the second component 120 are depicted as separate parts that are coupled together, the first component 110 and the second component 120 may be formed as a single part (see FIG. 2). Further, the first component 110 and the second component 120 may be formed as a single part by way of injection moulding, extrusion, or additive manufacturing such as 3D printing. The terms "couple" or "couples," as used herein, are intended to mean either an indirect or direct connection. Thus, by way of example, if a first device couples to a second device, that connection may be through a direct physical connection or through an indirect connection by way of straps, chains, or other elements of the container.

The first component 110 may include a base 112 and a rail connector 114 that extends from the base 112. The rail connector 114 may include a neck portion 115 and a head portion 116. Further, the head portion 116 may include a first flange 116a and a second flange 116b. Furthermore, in one or more embodiments, the first flange 116a and the second flange 116b may extend substantially perpendicular to the neck portion. While the rail connector 114 of the first component 110 is depicted as including a neck portion 115 and a head portion 116 with a first flange 116a and a second flange 116b, the rail connector 114 may include a head portion 116 having a single flange 116a or 116b or any one or more extensions shaped to fit a slot formed in a structural framing.

Further, the first component 110 may include a first hole 118 and one or more first connectors 119 (see FIG. 1B). The first hole 118 may be formed through the base 112 and the rail connector 114 of the first component 110. Further, in one or more embodiments, the first hole 118 may be threaded. The first connectors 119 may extend from the base 112 in the opposite direction of the rail connector 114. Further, each of the first connectors 119 may include a first connector hole 113. The one or more first connectors 119 may be disposed anywhere on the base 110, and, if there are at least two first connectors 119, the first connectors 119 are disposed such that they are parallel to each other and such that the first connector hole 113 through each first connector 119 is aligned with the first connector holes 113 of the other first connectors 119.

Furthermore, in one or more embodiments, the second component 120 may include a base 122 and a rail connector 124 that extends from the base 122. The rail connector 124 may include a neck portion 125 and a head portion 126. Further, the head portion 126 may include a first flange 126a and a second flange 126b. Furthermore, the first flange 126a and the second flange 126b may be substantially perpendicular to the neck portion 125. While the rail connector 124 of the second component 120 is depicted as including a neck portion 125 and a head portion 126 with a first flange 126a and a second flange 126b, in one or more embodiments, the rail connector 124 may include a head portion 126 having a single flange 126a or 126b or any one or more extensions shaped to fit a slot formed in a structural framing. Further, while the rail connector 114 of the first component 110 is depicted as being the same as the rail connector 124 of the second component 120, the first rail connector 114 may differ from the second rail connector 124 such that the rail connector 114 fits within a first slot formed in a structural framing having a first shape while the rail connector 124 fits within a second slot formed in the structural framing having a second shape that may be the same or different from the first shape.

Additionally, the second component 120 may include a second hole 128. The second hole 128 may be formed through the base 122 and the rail connector 124 of the second component 120. Further, in one or more embodiments, the second hole 128 may be threaded.

In one or more embodiments, the base 112 of the first component 110 may be coupled to the base 122 of the second component 120 such that the base 112 is substantially perpendicular to the base 122. However, the base 112 of the first component 110 may be coupled to the base 122 of the second component such that the base 112 and the base 122 form an angle between 45 degrees and 135 degrees. Further, in other embodiments, the base 112 of the first component 110 and the base 122 of the second component 120 may be coupled such that they form any angle so long as the rail connector 114 of the first component 110 fits within a first slot formed in a structural framing while the rail connector 124 of the second component 120 fits within a second slot formed in the structural framing.

Furthermore, the accessory mounting apparatus 101 may include a connector arm 130, which is configured to be coupled to the first component 110. The connector arm 130 may include a second connector 132 (see FIG. 1B), which includes a second connector hole 133, and a mounting arm 134, which includes a third connector hole 135. In one or more embodiments, the connector arm 130 may be coupled to the first component 110 by way of the one or more first connectors 119 of the first component 110 and the second connector 132 of the connector arm 130. The second connector hole 133 of the second connector 132 may be aligned with the first connector holes 113 of the one or more first connectors 119 such that a first fastener 171 may be disposed through the first connector holes 113 and the second connector hole 133 to couple the connector arm 130 to the first component 110. In one or more embodiments, the first fastener 171 may be a bolt, and a nut may be threaded onto the bolt and tightened to hold the connector arm 130 in place in relation to the first component 110. The connector arm 130 may be rotatable about an axis 175 of the first fastener 171, and coupling the connector arm 130 to the first component 110 by way of the first connectors 119 and the second connector 132 allows for the connector arm 130 to be angled relative to the base 112 of the first component 110 by an angle anywhere between −90 degrees to +90 degrees. Further, the third connector hole 135 of the mounting arm 134 may be configured such that a second fastener 172 may be disposed through the third connector hole 135 and coupled to an accessory, such as a sensor or camera (not shown). In one or more embodiments, the second fastener 172 disposed through the third connector hole 135 may be a screw or bolt configured to screw into the accessory, which couples the accessory to the connector arm 130. The second fastener 172 may be threaded or screwed into the accessory such that the accessory may be disposed at any angle between 0 degrees and 360 degrees relative to the mounting arm 134 of the connector arm 130.

Figure 2:
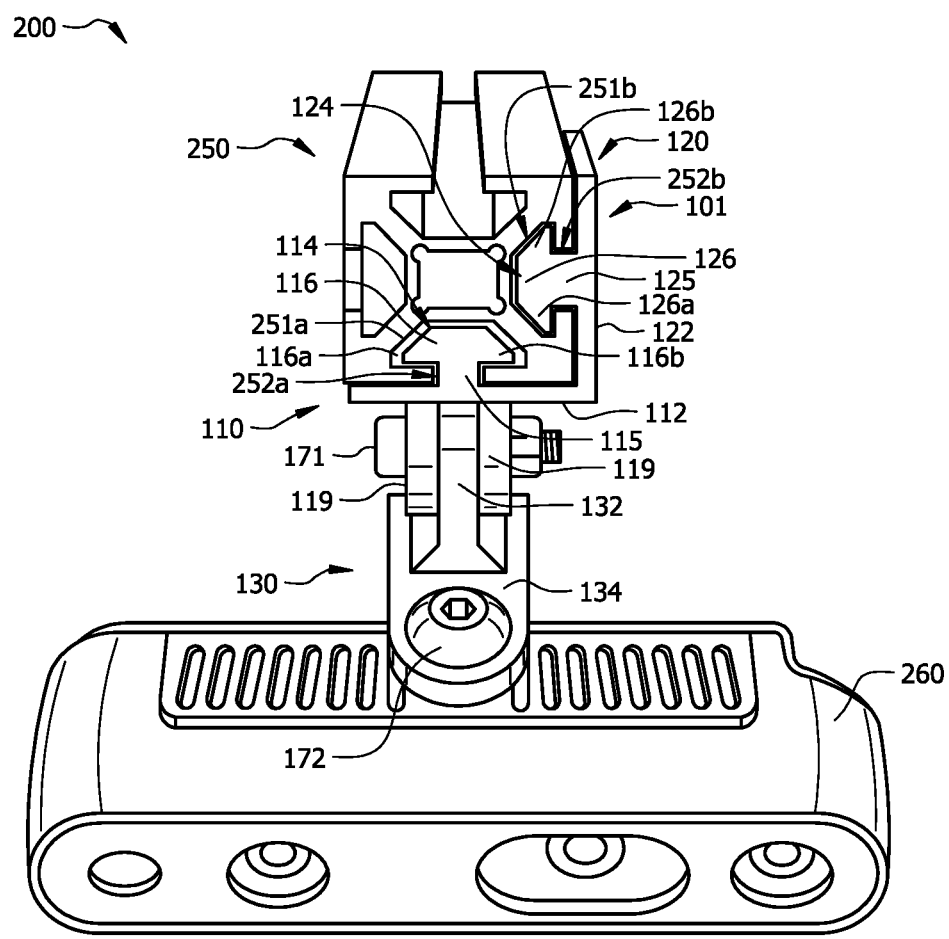
FIG. 2 is a perspective view of an accessory mounting system in accordance with an embodiment of the present disclosure.

Referring now to FIG. 2, an accessory mounting system 200 according to one or more embodiments of the present disclosure is illustrated. The accessory mounting system 200 may include an accessory mounting apparatus 101, a structural framing 250, and an accessory 260. The accessory mounting apparatus 101 may be configured to engage and be coupled to the structural framing 250 at a desired location along the structural framing 250. In one or more embodiments, the structural framing 250 may be aluminum extrusion framing or any structural framing having one or more slots for coupling an accessory to. The structural framing 250 may include at least a first rail slot 251a and a second rail slot 251b. The first rail slot 251a and the second rail slot 251b may each have an opening 252a,b, respectively. The opening 252a,b of each of the first rail slot 251a and the second rail slot 251b may be narrower than a width of a head portion 116 of a first component 110 of the accessory mounting apparatus 101 and of a head portion 126 of a second component 120 of the accessory mounting apparatus 101, respectively. Further, in one or more embodiments, the accessory mounting apparatus 101 may be configured to engage the first rail slot 251a, the second rail slot 251b, or both and may be coupled to the structural framing 250.

The accessory mounting apparatus 101 may be the accessory mounting apparatus as described above with regard to FIGS. 1A and 1B. The first flange 116a and the second flange 116b of the head portion 116 of the rail connector 114 of the first component 110 may be disposed within and engage the first rail slot 251a of the structural framing 250. Further, the first flange 126a and the second flange 126b of the head portion 126 of the rail connector 124 of the second component 120 may be disposed within and engage the second rail slot 251b of the structural framing 250. Furthermore, the neck portion 115 of the first component 110 and the neck portion 125 of the second component 120 may be disposed through the openings 252a,b of the first rail slot 251a and the second rail slot 251b, respectively.

The accessory 260 may be coupled to the accessory mounting apparatus 101 by way of the second fastener 172, which is disposed through the third connector hole (not shown) of the mounting arm 134. By way of example, in one or more embodiments, the fastener 172 disposed through the third connector hole may be a screw or bolt configured to screw into the accessory 260, which couples the accessory 260 to the connector arm 130. The second fastener 172 may be threaded or screwed into the accessory 260 such that the accessory 260 may be disposed at an any angle between 0 degrees and 360 degrees relative to the mounting arm 134 of the connector arm 130. Further, by way of example only, the accessory 260 in one or more embodiments may be a camera or a sensor.

Figure 3A:
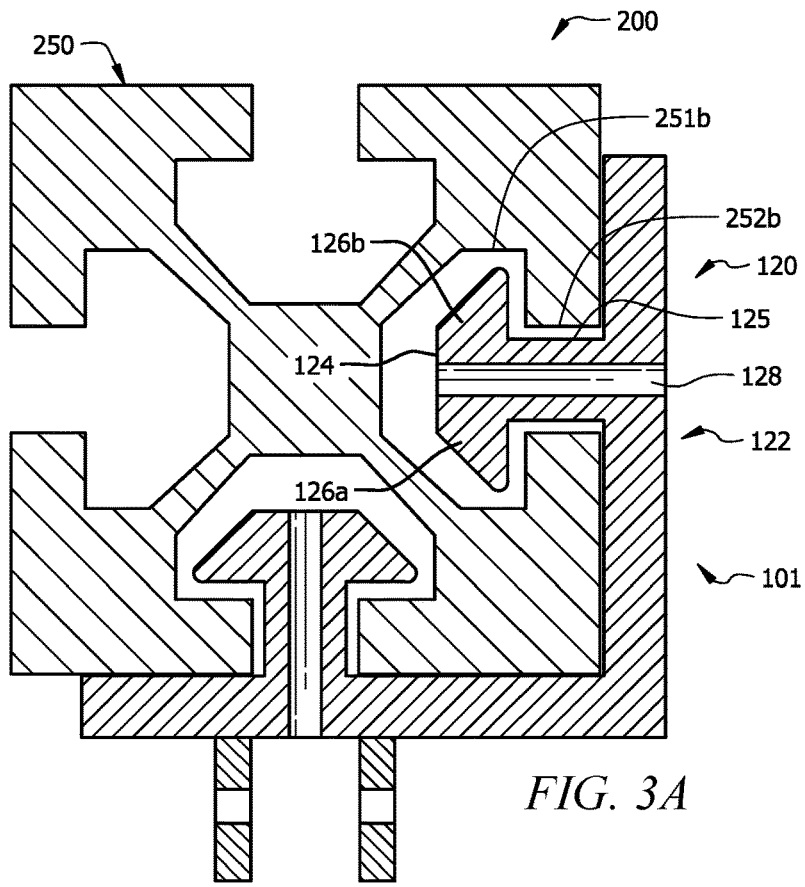
FIGS. 3A and 3B are cross-sectional views of an accessory mounting system in accordance with an embodiment of the present disclosure While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.
Figure 3B:
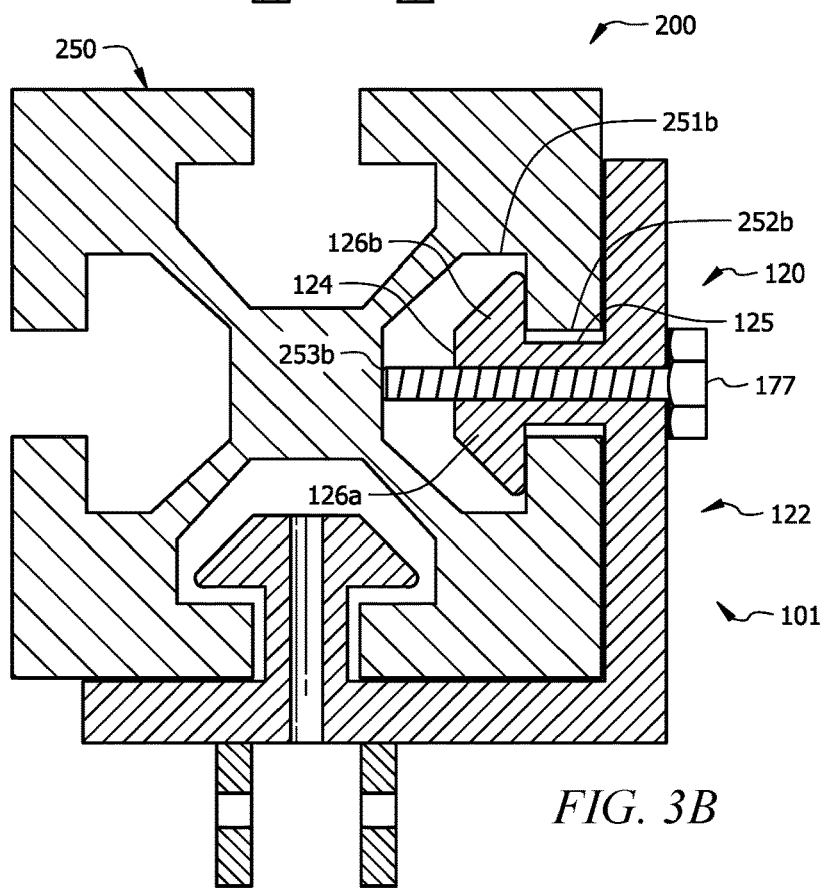

Referring now to FIGS. 3A and 3B, an accessory mounting system 200 according to one or more embodiments of the present disclosure is illustrated. When the accessory mounting apparatus 101 is disposed within structural framing 250, the accessory mounting apparatus 101 may be free to shift along the structural framing 250. Further, in one or more embodiments, a third fastener 177 may be disposed through the second hole 128 so as to fasten the accessory mounting apparatus 101 in place along the structural framing 250.

In one or more embodiments, as shown in FIG. 3A, when the accessory mounting apparatus 101 engages the structural framing 250, a gap may exist between the first flange 126a and the second flange 126b of the head portion 126 of the rail connector 124 and the rail slot 251b of the structural connector 250. The gap between the rail connector 124 and the rail slot 251b may allow the accessory mounting apparatus 101 to freely slide along a length of the structural framing 250. Once a location is chosen along the length of the structural framing 250 at which a user wishes to fasten the accessory mounting apparatus 101, a third fastener 177 may be threaded through the second hole 128, which is disposed through the neck portion 125 and the head portion 126 of the rail connector 124. The third fastener 177 may be threaded through the second hole 128 until it bears against a back 253b of the rail slot 251b, and then the third fastener 177 may be rotated further such that the neck portion 125 and the head portion 126 of the rail connector 124 compresses due to the interaction between the threads of the second hole 128 and the threads of the third fastener 177. Compression of the neck portion 125 and the head portion 126 of the rail connector 124 may eliminate the gap between the first flange 126a and the second flange 126b of the head portion 126 of the rail connector 124 and the rail slot 251b of the structural connector 250. Thus, a tension fit may be created between the second component 120 of the mounting apparatus 101 and the rail slot 251b of the structural framing 250. More specifically, in one or more embodiments, the compression creates a tension fit between the first flange 126a and the base 122 of the second component 120 about the rail slot 251b and between the second flange 126b and the base 122 of the second component 120 about the rail slot 251b. Thus, the accessory mounting apparatus 101 may be positionally locked to the structural framing 250.

Thus, in one or more embodiments, a position of the accessory 260 along the structural framing 250 may be adjusted, the accessory mounting apparatus 101 may be mounted to the structural framing 250, an angle of the accessory 260 relative to the base 112 of the first component 110 may be adjusted, the accessory 260 may be mounted to the accessory mounting apparatus 101, an angle of the accessory 260 relative to the mounting arm 134 may be adjusted, and the accessory 260 may be mounted to the mounting arm 134 of the accessory mounting apparatus 101. Therefore, the disclosed accessory mounting apparatus 101 and system 200 provide the ability to adjust the position and angle accessories as desired.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. An apparatus comprising:
a first component, wherein the first component includes a first base, a first rail connector that extends from the first base, and one or more first connectors, wherein the first rail connector includes a first neck portion and a first head portion, and wherein the first head portion includes a first flange and a second flange that extend from the first neck portion;
a second component, wherein the second component includes a second base and a second rail connector that extends from the second base, wherein the second rail connector includes a second neck portion and a second head portion, and wherein the second head portion includes a third flange and a fourth flange that extend from the second neck portion; and
a connector arm, wherein the connector arm includes a second connector and a mounting arm,
wherein the one or more first connectors are coupled to the second connector,
wherein the first flange and the second flange of the first head portion of the first rail connector are configured to engage a first rail slot of a structural framing, and
wherein the third flange and the fourth flange of the second head portion of the second rail connector are configured to engage a second rail slot of the structural framing.

2. The apparatus of claim 1, wherein:
the one or more first connectors extend from the first base;
the one or more first connectors include one or more first connector holes;
the second connector includes a second connector hole;
the one or more first connectors are coupled to the second connector by way of a first fastener;
the first fastener is disposed through the one or more first connector holes and the second connector hole.

3. The apparatus of claim 2, wherein:
the first fastener has an axis; and
the second connector is configured to rotate about the axis of the first fastener.

4. The apparatus of claim 3, wherein the second connector is configured to rotate between −90 degrees and +90 degrees relative to a direction in which the one or more first connectors extend from the first base.

5. The apparatus of claim 1, wherein the mounting arm of the connector arm includes a third connector hole, and wherein the mounting arm is configured to be coupled to an accessory by a second fastener disposed through the third connector hole.

6. The apparatus of claim 1, wherein:
the second component further includes a second hole; and
the second hole is disposed through the second base and the second rail connector.

7. The apparatus of claim 6, wherein the second hole is threaded, and wherein the second hole is configured to receive a third fastener.

8. The apparatus of claim 7, wherein when the third fastener is threaded into the second hole, the third flange, the fourth flange, and the second base form a tension fit against the second rail slot of the structural framing.

9. The apparatus of claim 1, wherein the first component is coupled to the second component.

10. The apparatus of claim 9, wherein the first component is coupled to the second component by way of one of an adhesive or a fourth fastener.

11. The apparatus of claim 9, wherein the first component is coupled to the second component by forming the first component and the second component together by one of injection moulding, extrusion, or additive manufacturing.

12. The apparatus of claim 9, wherein the base of the first component and the base of the second component are substantially perpendicular.

13. A system comprising:
a structural framing, wherein the structural framing comprises:
a first rail slot, wherein the first rail slot includes a first opening; and
a second rail slot, wherein the second rail slot includes a second opening;
an accessory mounting apparatus, wherein the accessory mounting apparatus comprises:
a first component, wherein the first component includes a first base, a first rail connector, and one or more first connectors, wherein the first rail connector includes a first neck portion and a first head portion, wherein the first head portion includes a first flange and a second flange that extend from the first neck portion, wherein the first flange and the second flange of the first head portion of the first rail connector are configured to engage the first rail slot, and wherein the first neck portion of the first rail connector is disposed through the first opening of the first rail slot;
a second component, wherein the second component includes a second base and a second rail connector, wherein the second rail connector includes a second neck portion and a second head portion, wherein the second head portion includes a third flange and a fourth flange that extend from the second neck portion, wherein the third flange and the fourth flange of the second rail connector are configured to engage the second opening of the second rail slot, and wherein the second neck portion of the second rail connector is disposed through the second opening of the second rail slot; and
a connector arm, wherein the connector arm includes a second connector and a mounting arm, wherein the one or more first connectors are coupled to the second connector; and
an accessory, wherein the accessory is coupled to the mounting arm.

14. The system of claim 13, wherein:
the one or more first connectors include one or more first connector holes;
the second connector includes a second connector hole;
the one or more first connectors are coupled to the second connector by way of a first fastener;
the first fastener is disposed through the one or more first connector holes and the second connector hole.

15. The system of claim 14, wherein:
the first fastener has an axis; and
the second connector is configured to rotate about the axis of the first fastener.

16. The system of claim 15, wherein the second connector is configured to rotate between −90 degrees and +90 degrees relative to a direction in which the one or more first connectors extend from the first base.

17. The system of claim 13, wherein the mounting arm includes a third connector hole.

18. The system of claim 17, wherein the accessory is coupled to the mounting arm by a second fastener disposed through the third connector hole.

19. The system of claim 13, wherein:
the second component further includes a second hole; and
the second hole is disposed through the second base and the second rail connector.

20. The system of claim 19, wherein a third fastener is disposed through the second hole, and wherein the third fastener is configured to couple the accessory mounting apparatus to the structural framing.

21. The system of claim 20, wherein the second hole is threaded, and wherein the third fastener is threaded through the second hole such that the third flange, the fourth flange, and the second base form a tension fit against the second rail slot of the structural framing.

22. The system of claim 13, wherein the first component is coupled to the second component such that the base of the first component is substantially perpendicular to the base of the second component.

23. The system of claim 22, wherein the first component is coupled to the second component by way of one of an adhesive or a fourth fastener.

24. The system of claim 22, wherein the first component is coupled to the second component by forming the first component and the second component together by one of injection moulding, extrusion, or additive manufacturing.

* * * * *